United States Patent
Laine et al.

(10) Patent No.: US 9,689,682 B1
(45) Date of Patent: Jun. 27, 2017

(54) POSITIONING AND NAVIGATION ACCORDING TO SCATTERED LIGHT IN SKY

(71) Applicant: The Charles Stark Draper Laboratory, Inc., Cambridge, MA (US)

(72) Inventors: Juha-Pekka J. Laine, Boston, MA (US); Benjamin F. Lane, Sherborn, MA (US); William W. Whitacre, Boston, MA (US); Robin Mark Adrian Dawson, Watertown, MA (US); Charles A. McPherson, Jr., Somerville, MA (US); Stephen P. Smith, Acton, MA (US); Matthew A. Sinclair, Stoneham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/086,566

(22) Filed: Mar. 31, 2016

(51) Int. Cl.
  *G01C 21/00* (2006.01)
  *G01C 21/02* (2006.01)
  *G06K 9/00* (2006.01)
  *G06F 17/30* (2006.01)

(52) U.S. Cl.
  CPC ......... *G01C 21/025* (2013.01); *G01C 21/005* (2013.01); *G06F 17/30241* (2013.01); *G06F 17/30259* (2013.01); *G06K 9/00664* (2013.01)

(58) Field of Classification Search
  CPC ............... G01C 21/025; G01C 21/005; G06F 17/30241; G06F 17/30259; G06K 9/00664
  See application file for complete search history.

(56) References Cited

U.S. PATENT DOCUMENTS

2006/0142943 A1   6/2006  Park ............................ 701/213
2010/0164974 A1*  7/2010  Fairclough ............. G06T 15/50
                                                                  345/582

OTHER PUBLICATIONS

Baddiley, "Modelling Skyglow," http://www.baddileysuniverse.net/RayTracing.aspx, 6 pages, Feb. 2015.
Baddiley, "Results of Modelling Skyglow," http://www.baddileysuniverse.net/ModelResults.aspx, 2 pages, Feb. 2015.
(Continued)

*Primary Examiner* — Yuen Wong
(74) *Attorney, Agent, or Firm* — Sunstein Kann Murphy & Timbers LLP

(57) ABSTRACT

Scattered light in the sky (sky glow) from light sources at one or more known geographic locations is used as reference point(s), from which geographic location of a system observing the sky glow is automatically ascertained. The light is scattered by particulates in the atmosphere. An upward looking camera captures an image of the sky, including the sky glow. A search engine automatically searches a catalog of modeled or pre-stored sky glows for a model that matches the image. Each model is associated with a geographic location. The models characterize each sky glow, such as in terms of color, intensity, etc., as the sky glow would appear from the associated geographic location. If a matching model is found, within a predetermined match criterion, the system outputs the geographic location associated with the matching model. Optionally, the geographic location is used to select and display a map of the geographic location.

21 Claims, 8 Drawing Sheets

(56) References Cited

OTHER PUBLICATIONS

Blue Marble Navigator, http://www.blue-marble.de/, 1 page, Apr. 2008.
Blue Marble Navigator, http://www.blue-marble.de/night.php, 3 pages, Mar. 15, 2015.
Leslie, "Netwatch," Science, vol. 311, 1 page, Mar. 2006.
Slanina "Aerosols," http://www.eoearth.org/view/article/149855/, The Encyclopedia of Earth, 3 pages, Jan. 2010.
Yachting Monthly, "Yachting Monthly Article, " http://www.naturalnavigator.com/the-library/yachting-monthly-feature, 10 pages, Jun. 2010.

* cited by examiner

POSITIONING AND NAVIGATION ACCORDING TO SCATTERED LIGHT IN SKY

TECHNICAL FIELD

The present invention relates to camera-based positioning and navigation and, more particularly, to camera-based positioning and navigation by matching sky glow images to models of ambient light scattered by particulates in the atmosphere.

BACKGROUND ART

It is known to determine a geographic position by measuring angles to stars or satellites, such as by a star camera. It is also known to navigate by matching images of stars or terrain to known images at predetermined locations, such as along a trajectory. In addition, visual odometry has been used to determine position and/or orientation of robots and vehicles. However, these methods suffer from various limitations.

For example, celestial sightings require clear sky. Clouds obscure the sky, and sky glow reduces contrast, thereby making it difficult or impossible to determine a position or navigate using celestial sightings. Furthermore, celestial sightings-based navigation is not extremely accurate.

Direct landmark imaging requires a matchable landmark to be available and visible. Typically, landmark matching systems use downward-looking cameras to image terrain. However, such landmarks are often unavailable or not visible, particularly at ground level, such as from the point of view of a dismounted hiker.

Visual odometry is a relative navigation technique characterized by error that increases as a function of distance traveled.

Improved position determination and navigation techniques would be beneficial.

SUMMARY OF EMBODIMENTS

An embodiment of the present invention provides a method for automatically ascertaining a geographic location. The method may be computer implemented. The method includes capturing a digital image of at least a portion of sky visible from the geographic location. The image may be captured automatically.

A plurality of digital sky light scattering models is automatically generated. The plurality of digital sky light scattering models may be stored in a memory. Each sky light scattering model characterizes light, as the light would appear from a corresponding candidate geographic location after the light was emitted by at least one light source disposed proximate the candidate geographic location and subsequently scattered by particulates disposed in an atmosphere proximate the at least one light source. The characterization may be stored as one or more digital data values in a memory. Each sky light scattering model is automatically associated with the corresponding candidate geographic location.

The plurality of sky light scattering models is automatically searched for a matching sky light scattering model that matches the image, within a match criterion. If, as a result of the searching, the matching sky light scattering model is found, the candidate geographic location associated with the matching sky light scattering model is automatically output.

Optionally, a digital map may be stored in a digital memory. The digital map may encompass candidate geographic locations corresponding to at least some of the plurality of sky light scattering models. Outputting the candidate geographic location may include automatically selecting a portion of the digital map that corresponds to the candidate geographic location associated with the matching sky light scattering model and automatically displaying the selected portion of the digital map. The digital map may be displayed on a display screen.

The digital map may include a topographic map, a street map and/or a map of at least one land mass and at least one body of water.

Automatically generating the plurality of sky light scattering models may occur before capturing the image. In addition, before capturing the image, the plurality of sky light scattering models may be stored in a digital memory.

The particulates may include water and/or dust.

Each light source may include a land-based light source, a sea-based light source and/or an air-based light source.

Each light source may include a building, a plurality of buildings, a sports arena, a billboard, a street light, a parking lot light, an automobile headlight, a beacon, a radio tower light, a village, a city, a land vehicle, a ship or an aircraft.

Each light source may include a geographically fixed-location light source or a geographically mobile light source.

Generating the plurality of sky light scattering models may include, for each geographically mobile light source, automatically modeling movement of the geographically mobile light source.

For each sky light scattering model, characterizing the light may include characterizing color of the light, color pattern of the light, intensity of the light, intensity pattern of the light, continuity of the light, location of the light in the sky, height of the light in the sky, width of the light in the sky and/or shape of the light in the sky, as apparent from the corresponding candidate geographic location.

Optionally, a compass reading may be automatically obtained at the geographic location. Automatically searching the plurality of sky light scattering models may include automatically adjusting the image or at least some of the plurality of sky light scattering models according to the compass reading.

Another embodiment of the present invention provides a system for automatically ascertaining a geographic location. Components of the system may be computer controlled. The system includes a digital camera. The digital camera is configured to capture an image of at least a portion of sky visible from the geographic location. The camera may be configured to automatically capture the image.

The system also includes a memory. The memory stores a plurality of digital sky light scattering models. Each sky light scattering model characterizes light, as the light would appear from a corresponding candidate geographic location after the light was emitted by at least one light source disposed proximate the candidate geographic location and subsequently scattered by particulates disposed in an atmosphere proximate the at least one light source. The characterization may be stored as one or more digital data values in the memory. Each sky light scattering model is associated with the corresponding candidate geographic location.

A search engine is configured to search the plurality of sky light scattering models in the memory for a matching sky light scattering model that matches the image within a match criterion.

A port is configured to automatically output the candidate geographic location associated with the matching sky light scattering model if, as a result of the searching, the matching sky light scattering model is found.

The system may also include a display panel coupled to the port. The display panel may be configured to automatically display the candidate geographic location associated with the matching sky light scattering model.

The system may also include a display panel and a memory. The memory may store a digital map. The digital map may encompass candidate geographic locations corresponding to at least some of the plurality of sky light scattering models.

The system may also include a map selector. The map selector may be coupled to the port. The map selector may be configured to automatically select a portion of the digital map that corresponds to the candidate geographic location associated with the matching sky light scattering model. The map selector may be further configured to automatically display, on the display panel, the selected portion of the digital map.

The system may also include a sky light scattering model generator configured to automatically generate the plurality of sky light scattering models and store the generated sky light scattering models in the memory.

Each sky light scattering model may characterize color of the light, color pattern of the light, intensity of the light, intensity pattern of the light, continuity of the light, location of the light in the sky, height of the light in the sky, width of the light in the sky and/or shape of the light in the sky, as apparent from the corresponding candidate geographic location.

The system may also include a compass. The digital camera may be configured to automatically adjust the image according to a reading from the compass.

The search engine may be configured to automatically adjust the image or at least some of the plurality of sky light scattering models according to a reading from the compass.

Yet another embodiment of the present invention provides a non-transitory computer-readable medium. The medium is encoded with instructions. When executed by a processor, the instructions establish processes for performing a computer-implemented method of automatically ascertaining a geographic location. The processes include capturing a digital image of at least a portion of sky visible from the geographic location. The image may be automatically captured.

A plurality of sky light scattering models is automatically generated. Each sky light scattering model characterizes light, as the light would appear from a corresponding candidate geographic location after the light was emitted by at least one light source disposed proximate the candidate geographic location and subsequently scattered by particulates disposed in an atmosphere proximate the at least one light source. The characterization may be stored as one or more digital data values in a memory. Each sky light scattering model is automatically associated with the corresponding candidate geographic location.

The plurality of sky light scattering models is automatically searched for a matching sky light scattering model that matches the image within a match criterion. If, as a result of the searching, the matching sky light scattering model is found, the candidate geographic location associated with the matching sky light scattering model is automatically output.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for automatically ascertaining a geographic location, using scattered light in the sky (sky glow). Sky glow from light sources at one or more known geographic locations is used as reference point(s), from which a geographic location of a system observing the sky glow is automatically ascertained. Successive spaced-apart positions of a moving system may be used to ascertain a direction of movement or velocity.

An upward looking camera captures an image of the sky, including the sky glow. A search engine automatically searches a catalog of modeled or pre-stored sky glows for a matching model. Each model is associated with a geographic location. The models characterize each sky glow, such as in terms of color, intensity, color and/or intensity pattern, shape, size, elevation, azimuth, etc. of the sky glow, as the sky glow would appear from the associated geographic location. The sky glow is caused by light emitted by one or more light sources at or near the geographic location and subsequently scattered by particulates in the atmosphere.

If a matching model is found, within a predetermined match criterion, the system outputs the geographic location associated with the matching model. Optionally, the geographic location is used to select and display a map of the geographic location. Such systems and methods may be used by hikers, dismounted soldiers and vehicles on the ground, as well as aircraft and watercraft.

Figure 1:
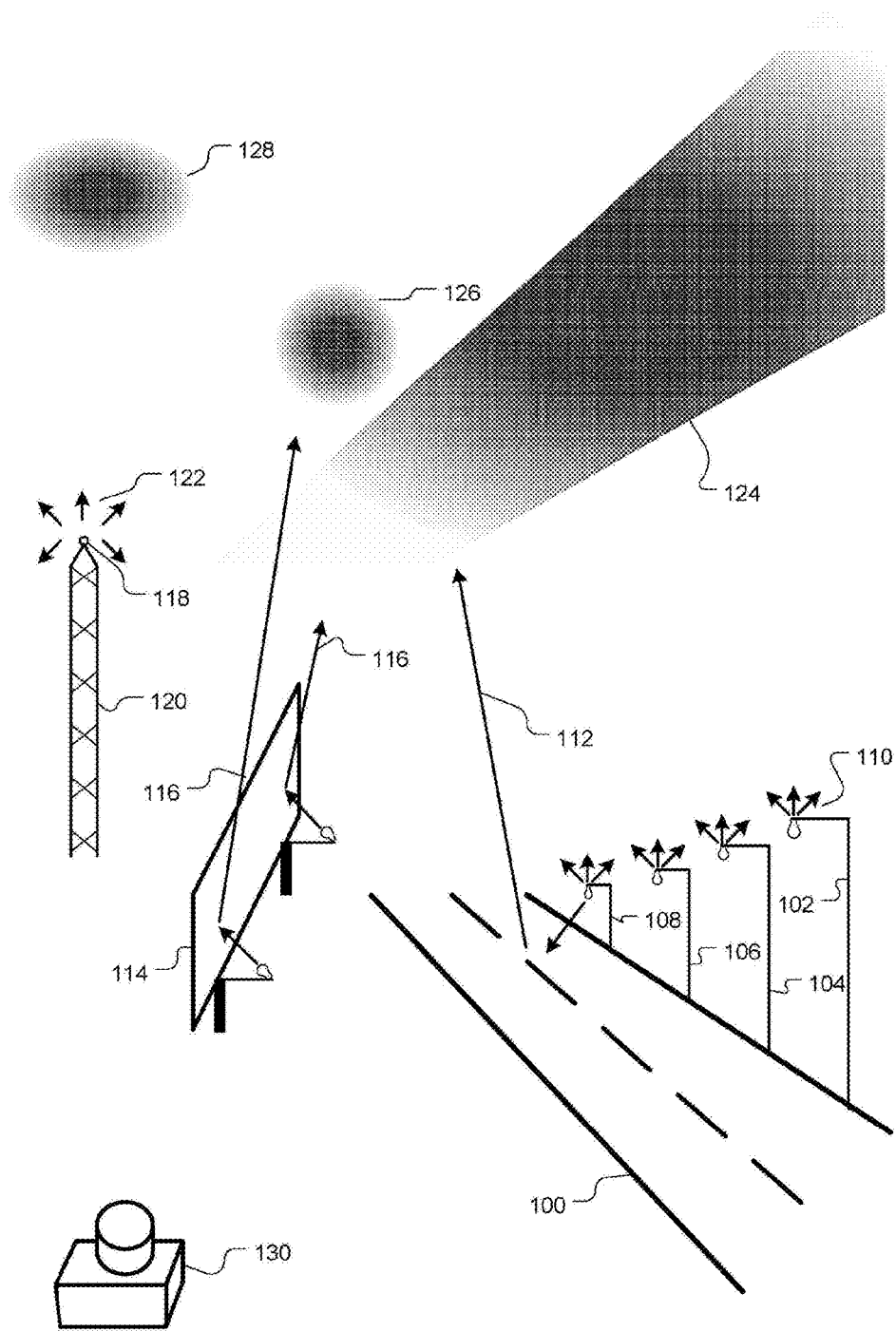
FIG. 1 is a perspective schematic illustration of a hypothetical geographic location, above which sky glow is present, and at which embodiments of the present invention may be used.

FIG. 1 is a perspective schematic illustration of a hypothetical geographic location, above which sky glow is present, and at which embodiments of the present invention may be used. As used herein, "light" refers to visible or invisible (to humans) electromagnetic radiation having a wavelength between about 10 nm and about 1 mm. A road 100 is illuminated by streetlights 102, 104, 106 and 108. Some light emitted by the streetlights 102-108 may be directed generally upward, as exemplified by arrows 110. Some downward directed light from the streetlights 102-108 reflects generally upward from the surface of the road 100, as exemplified by arrow 112. An illuminated billboard 114 reflects some light generally upward, as exemplified by arrows 116. A beacon 118 on a radio tower 120 emits some light generally upward, as exemplified by arrows 122.

The generally upward directed or reflected light 112, 116 and 122 is scattered by particulates in the atmosphere. Some of the light is scattered generally downward and is detectable from the ground as sky glow 124, 126 and 128, respectively. For clarity, the sky glow 124-128 is depicted in negative. The sky glow 124-128 is commonly referred to as light pollution which, among other things, poses problems for astronomers and others wishing to observe a night sky.

Other exemplary sources of light that may cause or contribute to the sky glow 124, 126 and/or 128, or other sky glow (not shown), include buildings, landscape lighting, sports arenas, parking lot lights, automobile headlights, other lights on land vehicles, runway and approach lights at airports, entire villages and entire cities or portions thereof. Non-land based sources, such as flying aircraft and ships on waterways (not shown), may also contribute to the sky glow 124, 126, and/or 128 or other sky glow (not shown).

Although sky glow is generally considered undesirable light pollution, embodiments of the present invention take advantage of sky glow from fixed or moving light sources whose geographic locations are known or can be predicted. These embodiments use the sky glow, essentially as landmarks, to ascertain a geographic location, where an observation is made. A system for automatically ascertaining a geographic location based on sky glow is shown in FIG. 1 at 130.

Figure 2:
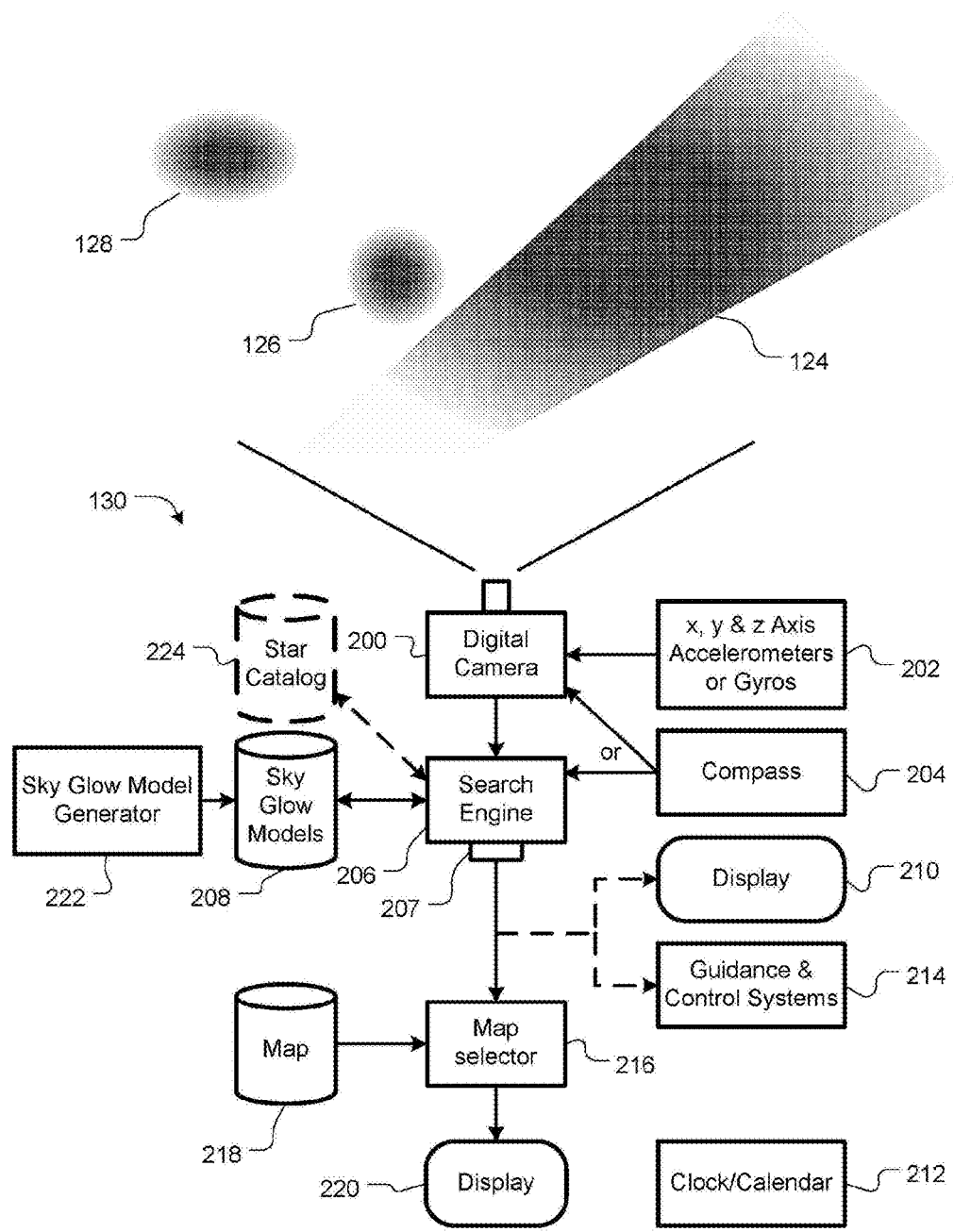
FIG. 2 is a schematic block diagram of a system for automatically ascertaining a geographic location using sky glow, such as the sky glow of FIG. 1, according to an embodiment of the present invention.

FIG. 2 is a schematic block diagram of the system 130, according to an embodiment of the present invention. A digital camera 200 captures an image of the sky, including the sky glow 124-128. The camera 200 may be sensitive to light at wavelengths of interest, particularly wavelengths of expected sky glow. If a range of wavelengths of interest is wider the bandwidth of a single digital camera, several digital cameras with individual, optionally overlapping, bandwidths may be used together. In some embodiments, the camera 200 includes a relatively wide-angle lens to capture a significant portion of the sky. For example, in some embodiments, the lens has a field of view of about 180°, although smaller and larger fields of view are acceptable.

Figure 3:
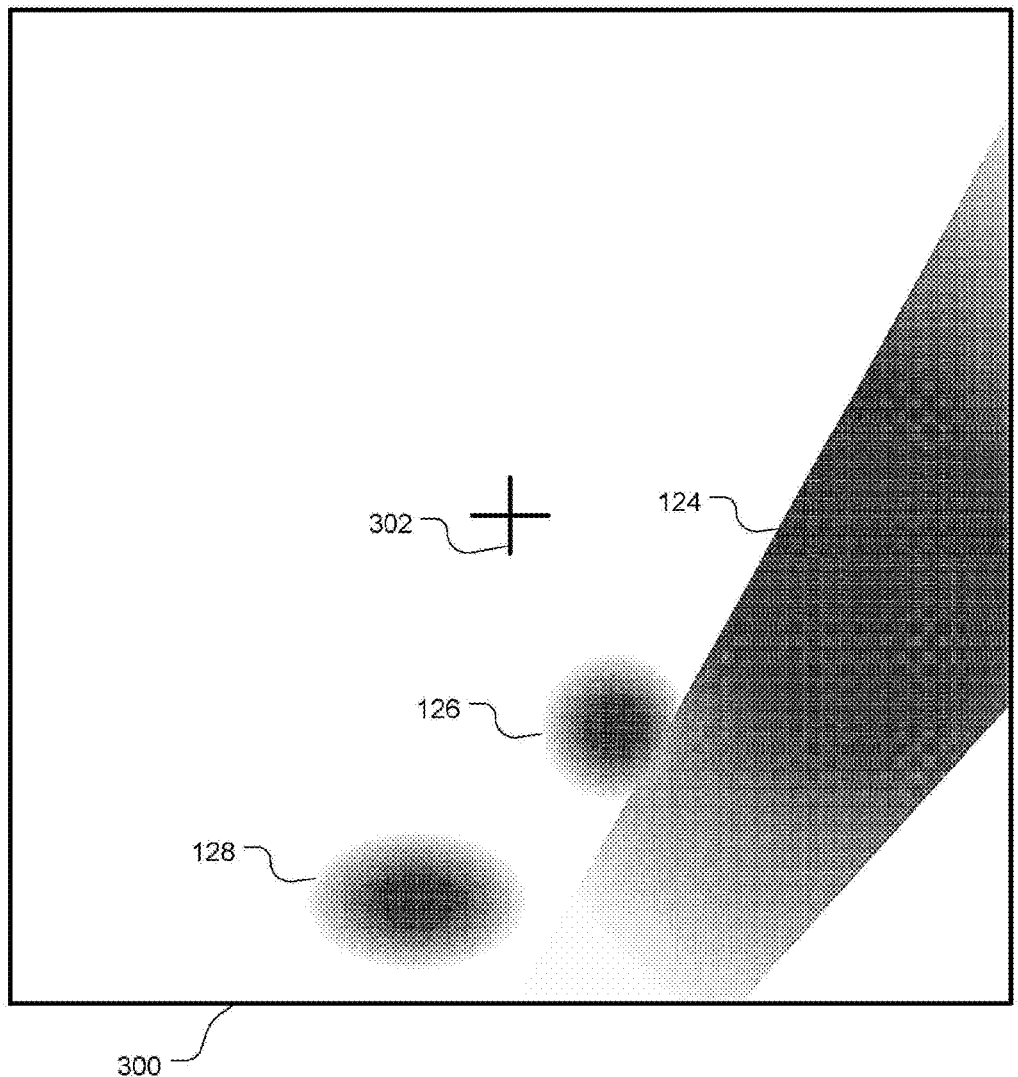
FIG. 3 is a hypothetical image, looking straight up at the sky of FIG. 1, as captured by a camera in the system of FIG. 2, according to an embodiment of the present invention.

FIG. 3 is a hypothetical image 300, looking straight up, i.e., toward the zenith, at the sky of FIG. 1, as captured by the camera 200. The camera 200 is located directly under the center of the image 300, where indicated by a crosshair 302. For clarity, the sky glow 124-128 is depicted in negative.

The camera 200 may be coupled to x-, y- and z-axis accelerometers or gyros 202. The camera 200 may use information from the accelerometers or gyros 202 to automatically correct the image 300, in case the camera 200 is not pointed straight up. Correcting the image 300 means automatically adjusting the image, so it appears to have been taken with the camera 200 pointing straight up. Conventional image processing techniques may be used to correct the image. Optionally or alternatively, the camera 200 may provide an indication to a user, such as via a display, to warn the user if the camera 200 is not aimed sufficiently vertically and/or to guide the user in aiming the camera 200 vertically.

Optionally or alternatively, the camera 200 may be mounted on a gimbal or other adjustable mount (not shown), and the information from the accelerometers or gyros 202 may be used by the system 130 to drive motors to automatically adjust the mount so as to aim the camera 200 straight up. Optionally or alternatively, the camera 200 may include information from the accelerometers or gyros 202 in the image 300, such as in metadata stored with the image 300, and the information may be used in subsequent processing, such as to automatically adjust models to compensate for non-vertical orientation of the camera 200.

Optionally, the digital camera 200 is coupled to an electronic or mechanical compass 204. The camera 200 may use information from the compass 204 to automatically determine a compass direction, such as north, and include the compass direction in the image 300, such as in metadata included with the image 300, to indicate orientation of the image, relative to north. Optionally or alternatively, the camera 200 may automatically rotate the image 300, so the image 300 is oriented preferentially, relative to the compass direction. For example, the camera 200 may rotate the image 300, so up, i.e., along the y axis, in the image 300 corresponds to north.

A search engine 206 automatically searches a catalog 208 of modeled or pre-stored sky glows (collectively referred to herein as "sky light scattering models" or "sky glow models") for one or more sky glows that match the sky glow in the image 300, within a match criterion. Information from the compass 204 and/or the accelerometers and/or gyros 202 may be used by the search engine 206 to automatically adjust the image 300 and/or the models, so they can be compared according to common reference directions. Conventional automatic image matching, pattern matching or other matching algorithms may be used. The match criterion may be set to accommodate expected variations in sky glow from a given light source, such as due to variations in atmospheric conditions, time of day, season, day of year, errors in the models, etc., and optionally in relation to a desired confidence level in accuracy of the match.

Each sky light scattering model may be stored as an image, information from which an image may be generated and/or characterizing data that may be compared to a digitally-analyzed image, such as image 300. In some cases, pre-captured images are stored in the sky glow models catalog 208. However, in other cases, access to geographic locations of interest, such as enemy territory, may not be available, thereby making such pre-captured images unavailable.

Numerical models of sky glow may be generated from available or estimated information about light sources, such as information from surveillance satellites. For example, reflections from asphalt roads, runways or parking lots may be estimated, given known or estimated reflection characteristics of asphalt or other nearby terrestrial surfaces and known or estimated light outputs of luminaires known or expected to be installed, their numbers and layout patterns. Light scatter from these reflections may be calculated or estimated, based on known or estimated characteristics of particulates, such as smog or water vapor, in the atmosphere proximate, mostly above, the luminaires.

For models of sky light scattering from mobile light sources, the models may include information about known or estimated movement of each mobile light source, such as velocity, altitude, path, etc. For models of sky light scattering from intermittent light sources, such as stroboscopic beacons on radio towers, the models may include information about periodicity, temporal intensity profiles and duty cycles of the light sources. Additional information about sky light scattering models and how they may be generated is provided herein.

If the search engine 206 finds a model or group of models in the sky glow models catalog 208 that matches the image 300 from the camera 200 within the match criterion, the search engine 206 notes the geographic location associated with the matching model or group of models (for simplicity, referred to herein as a sky light scattering model). The search engine 206 outputs, via a port 207, the geographic location, such as to a display 210. The geographic location may be output by the search engine 206 and displayed in any suitable format, such longitude and latitude, local east, north, up (ENU) or another geographic coordinate system.

Differences between successive geographic locations may be used, together with a clock 212, to calculate or estimate a speed of travel, such as by dividing distance between two geographic locations by travel time between the two locations, and the speed may be shown on the display 210. Similarly, a direction of travel may be calculated or estimated by vector subtracting one geographic location from the other geographic location, and the travel direction may be indicated on the display device 210. Similarly, a velocity may be calculated or estimated and displayed.

Optionally, the geographic location information may be automatically provided by the search engine 206 to a guidance and control system 214. In this case, the system 130 may form a navigation component of a guidance, navigation and control (GNC) system.

Optionally, the geographic location information may be automatically provided by the search engine 206 to a map selector 216. One or more digital maps (collectively herein referred to as a "map") may be stored in a map database 218. The map may encompass geographic locations corresponding to at least some of the sky light scattering models in the models catalog 208. The map selector 216 uses the geographic location provided by the search engine 206 to automatically select a map, a portion of a map or several maps in the map database 218 that, individually or collectively, correspond to the geographic location. The selected map, portion of a map or several maps is referred to herein as a selected "portion of a map" or a selected "map portion." The map selector 216 then displays the selected map portion on a display device 220. The display devices 220 and 210 may be separate devices, or a single display device may be used for both displays 220 and 210.

Figure 4:
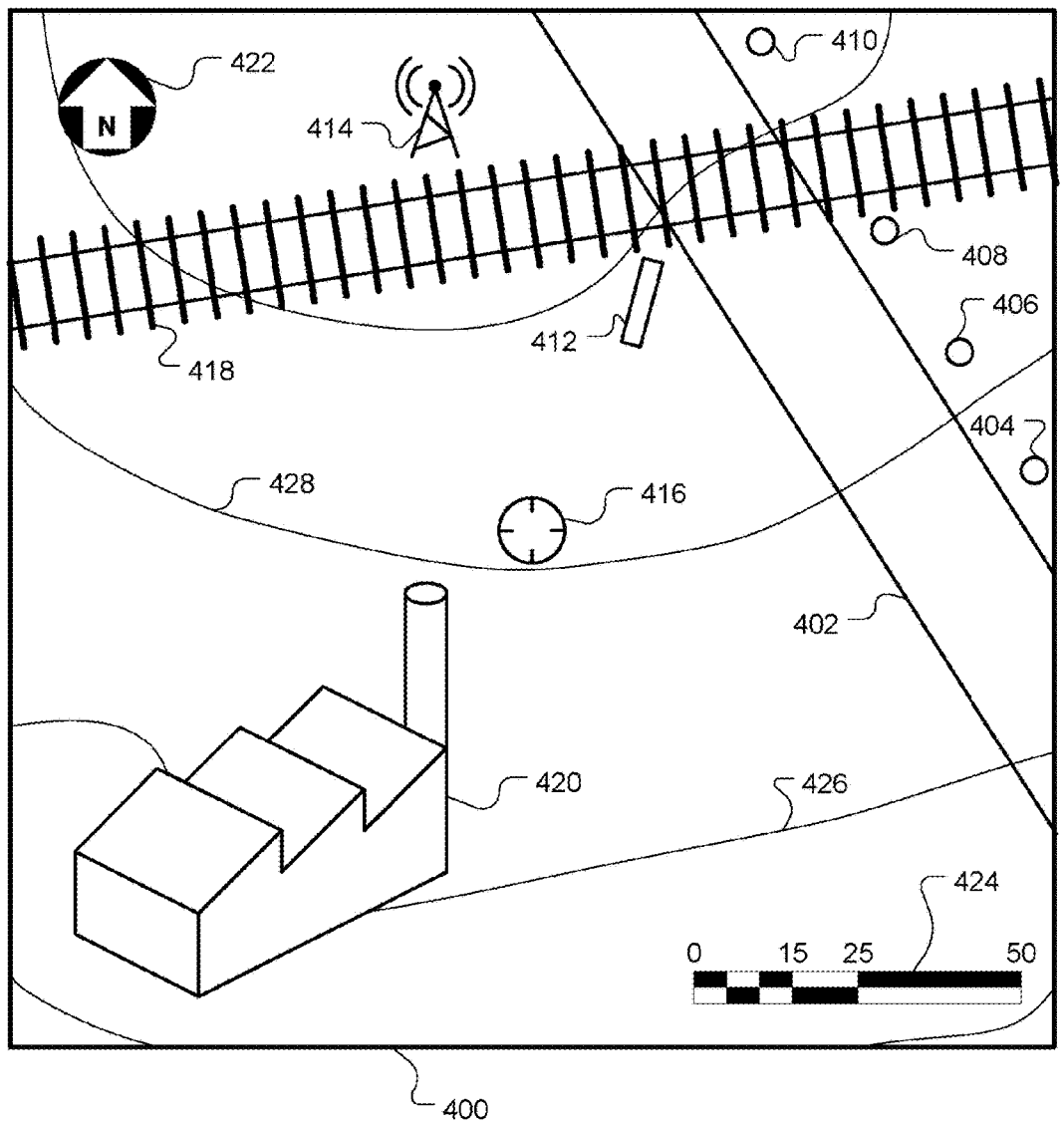
FIG. 4 is a hypothetical exemplary map portion displayed by the system of FIG. 2 after automatically matching the sky glow in FIG. 3 to a sky glow model, according to an embodiment of the present invention.
Figure 5:
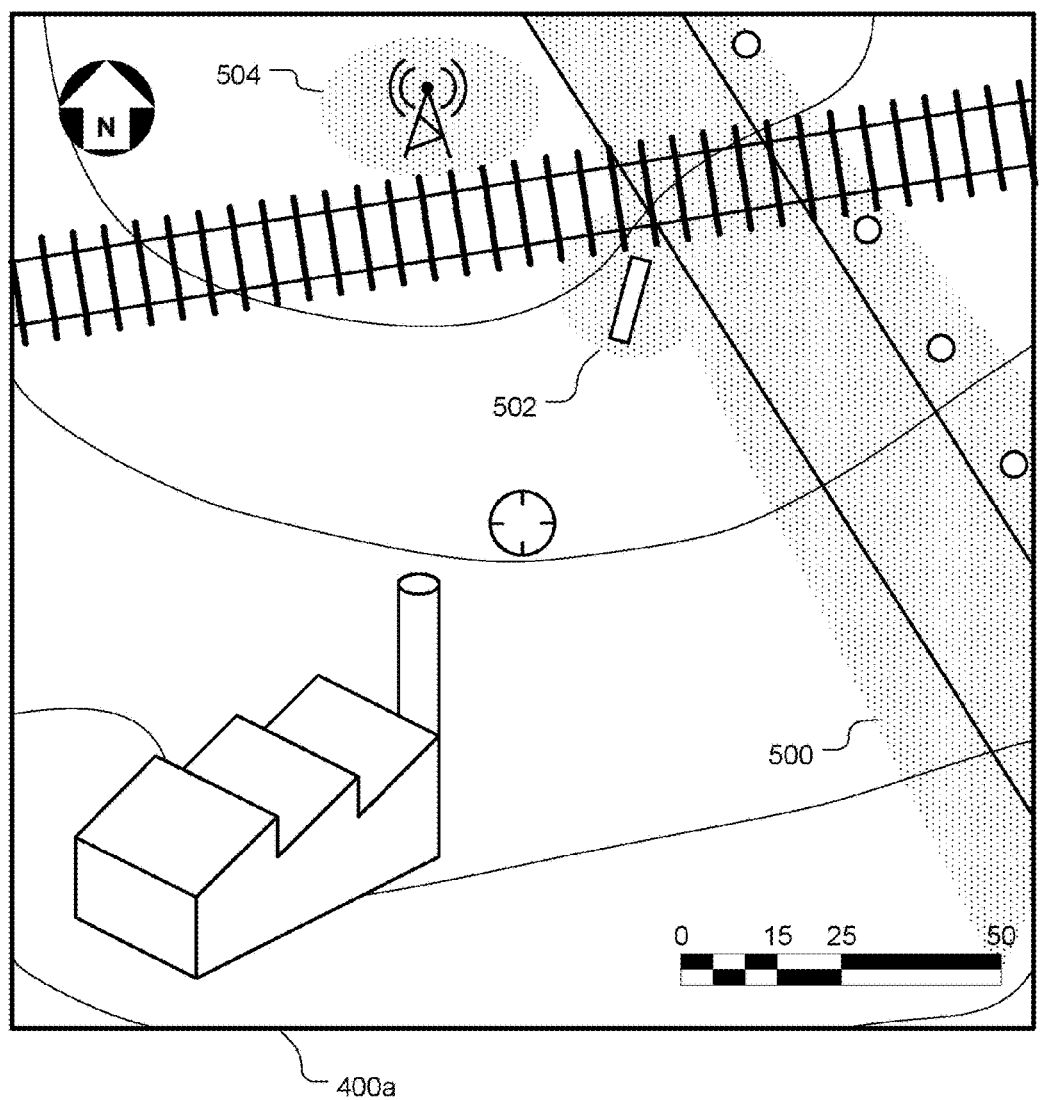
FIG. 5 is another hypothetical exemplary map portion displayed by the system of FIG. 2, similar to the map portion of FIG. 4, except also including icons representing the sky glow, according to an embodiment of the present invention.

FIG. 4 is a hypothetical exemplary map portion 400 displayed by the map selector 216 on the display device 220. The map portion 400 corresponds to the geographic location of the system 130 in FIG. 1. The map portion 400 includes icons, such as a road icon 402 that represents the road 100 in FIG. 1, streetlight icons 404, 406, 408 and 410 that represent streetlights 102-108, respectively, in FIG. 1, a billboard icon 412 that represents the billboard 114 in FIG. 1, a radio tower icon 414 that represents the radio tower 120 of FIG. 1 and a location icon 416 for the location of the system 130 in FIG. 1. Optionally, as shown in FIG. 5, the map portion 400a may also include icons 500, 502 and 504 representing the sky glow 124-128, respectively.

Returning to FIG. 4, the map portion 400 also includes icons for features not visible in FIG. 1, such as a railroad track 418 and a factory 420. In addition, the map portion 400 may include indicia, such as a north direction symbol 422, a scale 424 and topographical contour lines, exemplified by contour lines 426 and 428. It should be noted that the map portion 400 represents a top view, i.e., downward view, of the earth, whereas the image 300 represents an upward view from the earth toward the sky. Therefore, the map 400 is flipped about a horizontal axis (i.e., the horizon in FIG. 1), relative to the image 300.

Sky Glow Model Generation

As noted with respect to FIG. 2, the search engine 206 searches a catalog 208 of sky glow models for a model that matches, within a match criterion, sky glow in the image 300 (FIG. 3) captured by the camera 200. The catalog 208 is populated with sky glow models generated by a sky glow model generator 222. The sky glow model generator 222 automatically generates several sky light scattering models. Each sky light scattering model characterizes light, as the light would appear from a corresponding geographic location, after the light was emitted by one or more light sources at or near the geographic location and subsequently scattered by particulates in the atmosphere near, typically above, the light source(s). The sky glow model generator 222 also associates each sky light scattering model with the corresponding geographic location.

The sky glow model generator 222 also stores, in the catalog 208, a digital map that encompasses the geographic locations associated with the sky light scattering models, although a separate memory may be used for the map. The map may include a single map or a set of maps that collectively encompass the geographic locations associated with the sky light scattering models. For example, the map may include a set of maps, one map per possible geographic location. Each map may include a topographic map and/or a street map. The map may include a map of one or more land masses, or a portion of a land mass, and/or one or more bodies of water, or a portion thereof, such as a coastal map.

Typically, but not necessarily, the sky glow model generator 222 generates the models and stores the models and map in the catalog 208 before the camera 200 captures the image(s) of the sky. For example, the catalog 208 may be created or updated before a hiker, ground vehicle, airplane, ship or the like undertakes a mission, during which images will be captured and used to automatically ascertain one or more geographic locations.

As noted, each model characterizes light, as the light would appear from a corresponding geographic location, after the light was emitted by one or more light sources and subsequently scattered by atmospheric particulates. Several considerations are provided for modeling scattered light. Each model may characterize color of the light, color pattern of the light, intensity of the light, intensity pattern of the light, continuity of the light, location of the light in the sky, height of the light in the sky, width of the light in the sky and/or shape of the light in the sky, etc., as apparent from the corresponding geographic location. The characteristics of the scattered light, as detectable from the geographic location, may depend on factors, such as the light source (ex., high-pressure sodium lamp, arc lamp, xenon discharge stroboscopic lamp, light-emitting diode (LED), etc.), whether the light source is geographically fixed or mobile, type of particulates present above and near the light source, altitude of the particulates above the light source, time of day and/or time of year.

As discussed with respect to FIG. 1, light from various sources is emitted toward the sky and/or reflected toward the sky, where the light is scattered. Intense sky glow, such as from a city, may be reflected by the surface of the earth, including structures on the earth, to become a secondary terrestrial light source, which is then re-scattered. Such reflections may occur several times, leading to sky glow visible 10 km or more from the original light source.

Liquid droplets, small particles and molecules can scatter light. As used herein, a particulate is a liquid droplet, a solid particle or a molecule; an aerosol is a suspension of particulates in air. Most liquid droplets and solid particles in aerosols are about 0.001 µm to about 100 µm in diameter. Small mineral grains ("dust") are formed by mechanical disintegration of a parent material and range in size from submicron 1 μm) to visible. Fumes are condensed vapors or gaseous combustion products and are typically less than about 1 μm in diameter. Mist is formed by condensation or atomization; mist particulates range in size from submicron to about 20 μm. Smoke particulates result from incomplete combustion and are typically less than 1 μm in diameter. Smog is a photochemical reaction product of sunlight shining on hydrocarbon vapors, usually combined with water vapor; smog particulates are usually less than about 2 μm in diameter. Particulate size may be affected by relative humidity. For example, inorganic particles, such as sea salt, tend to take up more water vapor, grow larger, and therefore scatter more light, than organic particles.

Aerosols vary greatly in composition. Some aerosols contain droplets of salt water. Smoke and Diesel engine exhaust contain small carbon particles that scatter, as well as absorb, light. Volcanic plumes may contain mercury, iridium, arsenic and other metals.

Figure 6:
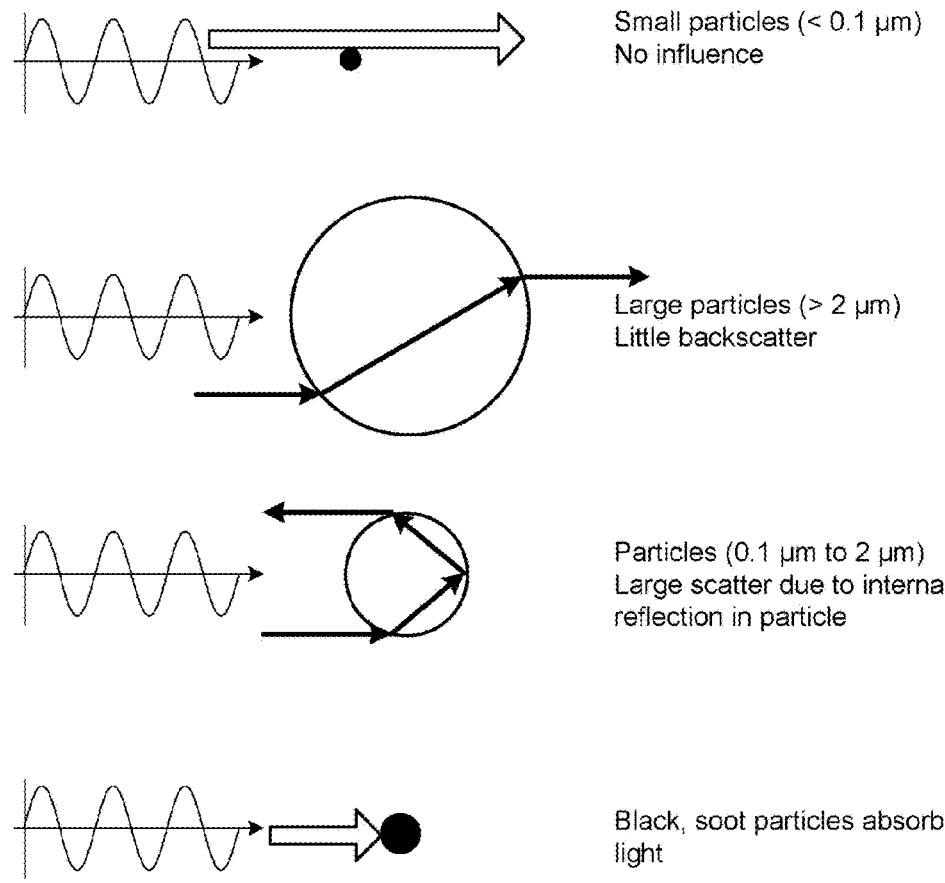
FIG. 6 is a schematic diagram illustrating interaction of solar light and particles, according to the prior art.

Two types of scattering occur in the atmosphere. Rayleigh scattering, which is caused by all particulates, scatters light in all directions. However, the extent of the scattering depends on the wavelength of the light, with short wavelengths being scattered more than long wavelengths, leading to a clear sky appearing blue (in the visible range of wavelengths). Mie scattering, which is more intense than Rayleigh scattering, backscatters wavelengths that are about equal to particulate diameter. In addition, liquid droplets between about 0.1 μm and about 2 μm strongly back-reflect light due to internal reflection, as shown schematically in FIG. 6 (copied from Sjaak Slanina, "Aerosols," The Encyclopedia of Earth, Jan. 2, 2010). Larger droplets cause little back-reflection; instead, light is refracted by these droplets, as shown schematically in FIG. 6.

Most particles and droplets are on the order of a few wavelengths of light in diameter. Consequently, the wave nature of light may be used to calculate aerosol scattering. Small obstructions can diffract light, much like a pinhole of the same size. Therefore, most scattering by particles and droplets is by diffraction. Because particles and droplets are usually slightly larger in diameter than the wavelength of light, most particles and droplets scatter all wavelengths about equally well. Consequently, an aerosol of such particles or droplets looks white (in the visible range of wavelengths). However, if the particles and droplets are comparable in diameter to the wavelength of the light, a very fine aerosol can look bluish (in the visible range).

Information about spectra emitted by most light sources is readily available, such as from manufacturers of lamps and luminaires and other sources. For example, "Recommendations for Evaluating Street and Roadway Luminaires," Vol. 10, Issue 1, April, 2011 is available from the Lighting Research Center at Rensselaer Polytechnic Institute, Troy, N.Y. A "FHWA Lighting Handbook August 2012" is available from the U.S. Department of Transportation, Federal Highway Administration, as Report No. FHWA-SA-11-22. Some such documents tabulate information about various types of light sources, such as indicating that low-pressure sodium (SOX) lamps used in many street lighting applications emit two dominant spectral lines very close together at 589.0 nm and 589.6 nm.

Additional information about light scattering in the atmosphere is available from Chris Baddiley, for example "Light Pollution—Introduction," "Modelling SkyGlow" and "Results of Modelling SkyGlow" (www.baddileysuniverse.net).

The Bortle Dark-Sky Scale, originally published in Sky & Telescope magazine, may be useful to quantify sky glow and general sky clarity. The Bortle Dark-Sky Scale defines a nine-class scale that rates darkness of the night sky and visibility of its phenomena.

The entire contents of all the above-referenced documents are hereby incorporated by reference herein for all purposes.

As noted, geographically mobile light sources may emit light that is eventually scattered. Such mobile light sources include automobiles, flying aircraft and ships on waterways. If movement of such mobile light sources can be estimated or predicted, such as from bus, airline or shipping line schedules, these movements may be used as bases for generating models of scattered light that originates with these mobile light sources, including land-based light sources, sea-based light sources and air-based light sources, thereby modeling movement of the geographically mobile light sources.

Even if schedules of individual mobile light sources, such as automobiles on a highway, cannot be estimated or predicted, generalizations about motion of these light sources, such as speed and path, even if not time, can be made from maps of highways and speed limits. Then, once the digital camera 200 (FIG. 2) captures images with light assumed by the search engine 206 to originate from a moving automobile, the model(s) in the catalog 208 can be used to predict or estimate sky glow from that automobile.

Figure 7:
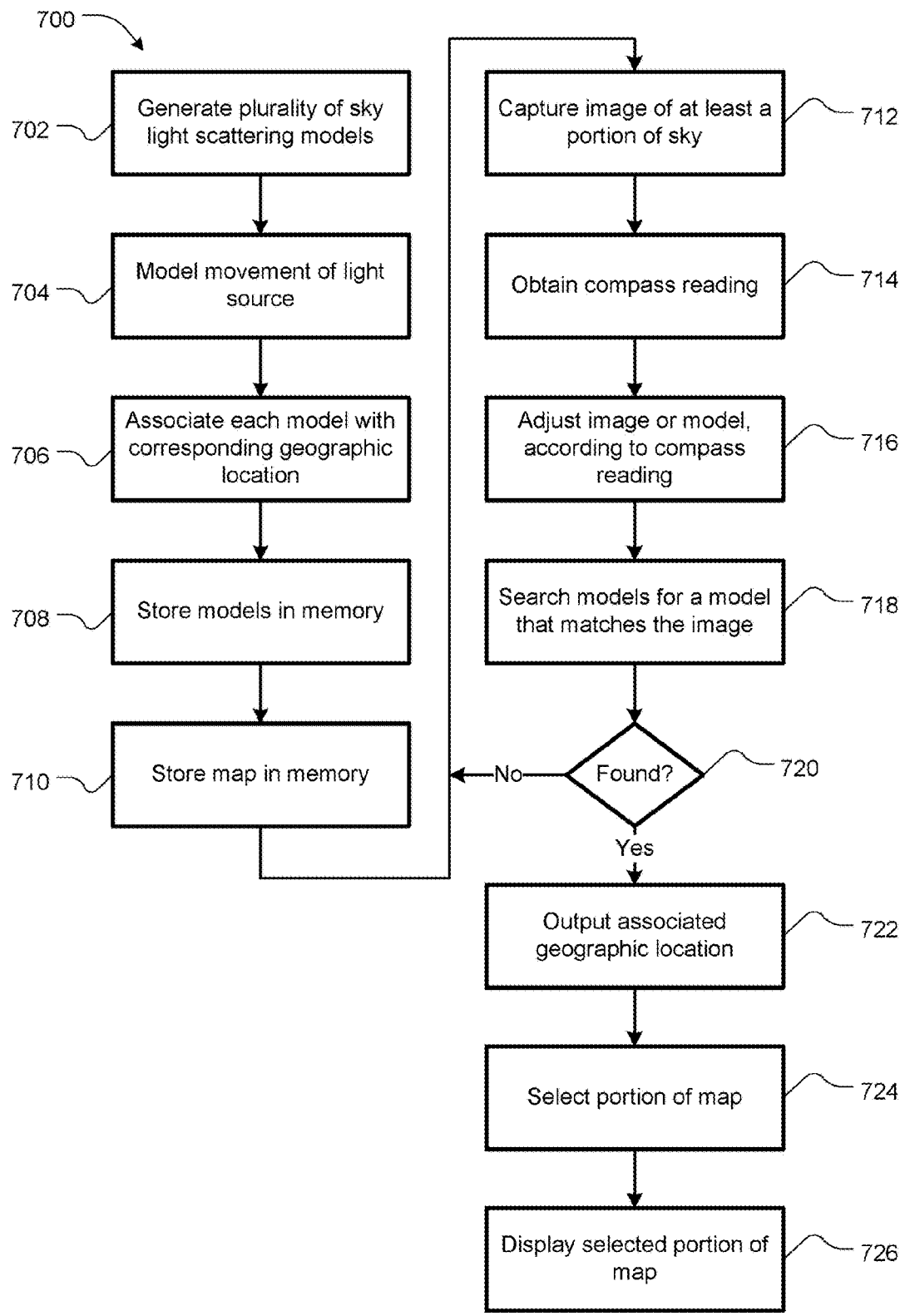
FIG. 7 is a flowchart schematically illustrating a method for automatically ascertaining a geographic location, according to an embodiment of the present invention.

FIG. 7 is a flowchart 700 schematically illustrating a method for automatically ascertaining a geographic location, according to an embodiment of the present invention.

At 702, two or more sky light scattering models are automatically generated. Each sky light scattering model characterizes light, as the light would appear from a corresponding geographic location after the light was emitted by at least one light source disposed at or near the geographic location and subsequently scattered by particulates in the atmosphere near the light source(s). Characterizing the light may include characterizing color of the light, color pattern of the light, intensity of the light, intensity pattern of the light, continuity of the light, location of the light in the sky, height of the light in the sky, width of the light in the sky and/or shape of the light in the sky, as apparent from the corresponding geographic location.

Optionally, at 704, for each light source that is geographically mobile, movement of the light source is modeled. At 706, each model is associated with the light source's corresponding geographic location, i.e., the location from which the sky glow may be observed.

Optionally, at 708, the models are stored in a digital memory. At 710, a digital map is stored in a digital memory. A single digital memory may be used for both the models and the map, or separate memories may be used. The map encompasses geographic locations that correspond to at least some of the models.

At 712, an image of at least a portion of sky visible from a geographic location is captured. "Visible" means imagable by one or more digital cameras, regardless of wavelength. Optionally, at 714, a compass reading is automatically obtained at the geographic location where the image was captured. At 716, the image may be automatically adjusted according to the compass reading, such as to make up, i.e., along the y axis, in the image corresponds to north.

At 718, the models are automatically searched for a matching sky light scattering model that matches the image, within a match criterion. Optionally, one or more models are automatically adjusted according to the compass reading. At 720 if, as a result of the searching, a matching sky light scattering model is found, control passes to 722, where the geographic location associated with the matching model is output, such as on a display. However, if as a result of the searching, no matching sky light scattering model is found, the image and/or the models may be adjusted to compensate for possible off-vertical orientation of the camera or non-north orientation of the image, or control may pass to 712. Optionally, at 724, a portion of the digital map that corresponds to the geographic location associated with the matching model is automatically selected, and at 726 the selected portion of the map is displayed.

Figure 8:
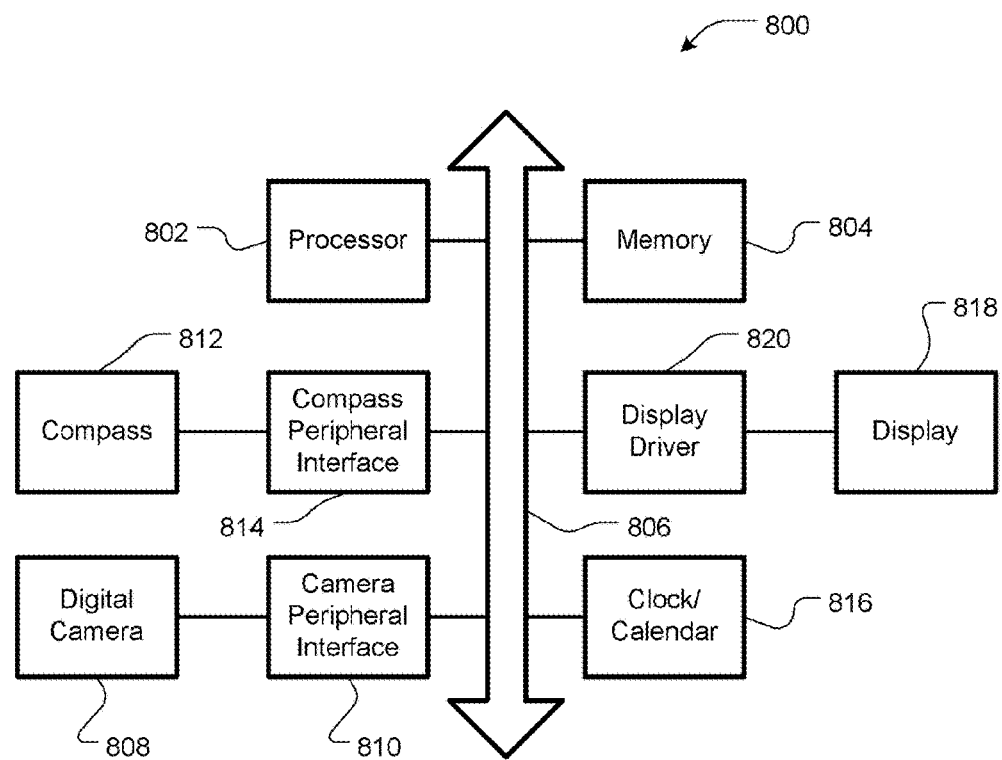
FIG. 8 is a schematic block diagram of a processor-based embodiment of the present invention.

The search engine 206 (FIG. 2), the map selector 216, the model generator 222, some or all of the operations described with respect to FIG. 7, and other aspects of embodiments of the present invention may be implemented by a processor executing instructions stored in a digital memory. FIG. 8 is a schematic block diagram of a processor-based embodiment 800 of the present invention. A processor 802 is coupled to a memory 804, as well as to other components, via an interconnect bus 806 in a conventional manner. The memory 804 stores instructions and data. The processor 802 fetches the instructions from the memory 804 and executes the instructions. The processor 802 also fetches and/or stores data in the memory 804.

A digital camera 808 is coupled to the interconnect bus 806 via a camera peripheral interface circuit 810. The camera 808 captures one or more images of the sky, as described herein. The processor 802 receives data representing the image(s) from the camera 808 via the interface bus 806. Optionally, the data representing the image(s) may be buffered in the memory 804 prior to being supplied to the processor 802. The processor 802 processes the image data, as described herein.

An electronic or mechanical compass 812 is coupled to the interconnect bus 806 via a compass peripheral interface circuit 814. The processor 802 receives data, such as a compass orientation of the camera 808, via the compass peripheral interface circuit 814. The processor 802 processes the compass data, as described herein.

An electronic clock/calendar 816 is coupled to the interconnect bus 806. The processor 802 obtains time and/or date information from the clock/calendar 816, such as to calculate a rate of change of location (speed) or to automatically adjust a model based on a time of day, day of week, season of year, etc.

An electronic display 818, such as a liquid crystal display panel, is coupled to the interconnect bus 806 via a display driver circuit 820. The processor 802 displays information, such as a current location and/or a portion of a map, on the display 818, as described herein.

Although largely ground-based systems have been described, any embodiment may be used aloft. In such cases, the models should be adjusted to account for the altitude of the camera 200 (FIG. 2).

While the invention is described through the above-described exemplary embodiments, modifications to, and variations of, the illustrated embodiments may be made without departing from the inventive concepts disclosed herein. For example, embodiments of the present invention may be combined with conventional celestial objects sighting navigation systems, such as star cameras or star trackers, including a conventional star catalog 224 (FIG. 2). In such combinations, the conventional celestial objects sighting navigation systems may be used when sky conditions are conducive to observing the celestial objects.

Furthermore, disclosed aspects, or portions thereof, may be combined in ways not listed above and/or not explicitly claimed. Embodiments disclosed herein may be suitably practiced, absent any element that is not specifically disclosed herein. Accordingly, the invention should not be viewed as being limited to the disclosed embodiments.

While specific parameter values may be recited in relation to disclosed embodiments, within the scope of the invention, the values of all of parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as discrete components, combinatorial logic, Application Specific Integrated Circuits (ASICs), Field-Programmable Gate Arrays (FPGAs) or other hardware), firmware or combinations thereof.

Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. The processor may be a single-core or multi-core microprocessor, digital signal processor (DSP), industrial microcontroller or the like.

Instructions defining the functions of the present invention may be delivered to a processor in many forms, including, but not limited to, information permanently stored on tangible non-writable non-transitory storage media (e.g., read-only memory devices within a computer, such as ROM, or devices readable by a computer I/O attachment, such as CD-ROM or DVD disk), information alterably stored on tangible non-transitory writable storage media (ex., floppy disk, removable flash memory, recordable DVD or hard drives) or information conveyed to a computer through a communication medium, including wired or wireless computer networks.

What is claimed is:

1. A method for automatically ascertaining a geographic location, the method comprising:
   capturing a digital image of at least a portion of sky visible upward from the geographic location;
   automatically generating, by a processor, a plurality of digital sky light scattering models, each sky light scattering model characterizing light, as the light would appear from a corresponding candidate geographic location after the light was emitted by at least one light source disposed proximate the candidate geographic location and subsequently scattered by particulates disposed in an atmosphere proximate the at least one light source;
   automatically associating, by a processor, each sky light scattering model with the corresponding candidate geographic location;

automatically searching, by a processor, the plurality of sky light scattering models for a matching sky light scattering model that matches the image within a match criterion; and as a result of the searching, the matching sky light scattering model is found, automatically outputting, by a processor, to at least one of: a display panel, a map selector, a guidance system, a navigation system and/or a control system, the candidate geographic location associated with the matching sky light scattering model as the ascertained geographic location.

2. The method according to claim 1, further comprising:
storing, in a digital memory, a digital map encompassing candidate geographic locations corresponding to at least some of the plurality of sky light scattering models,
wherein the outputting the candidate geographic location comprises:
automatically selecting a portion of the digital map that corresponds to the candidate geographic location associated with the matching sky light scattering model; and
automatically displaying the selected portion of the digital map.

3. The method according to claim 2, wherein the digital map comprises a topographic map.

4. The method according to claim 2, wherein the digital map comprises a street map.

5. The method according to claim 2, wherein the digital map comprises a map of at least one land mass and at least one body of water.

6. The method according to claim 1, wherein automatically generating the plurality of sky light scattering models occurs before capturing the image further comprising before capturing the image, storing, in a digital memory, the plurality of sky light scattering models.

7. The method according to claim 1, wherein the particulates comprise water and/or dust.

8. The method according to claim 1, wherein each light source comprises a land-based light source, a sea-based light source and/or an air-based light source.

9. The method according to claim 1, wherein each light source comprises a building, a plurality of buildings, a sports arena, a billboard, a street light, a parking lot light, an automobile headlight, a beacon, a radio tower light, a village, a city, a land vehicle, a ship and/or an aircraft.

10. The method according to claim 1, wherein each light source comprises a geographically fixed-location light source or a geographically mobile light source.

11. The method according to claim 10, wherein generating the plurality of sky light scattering models comprises, for each geographically mobile light source, automatically modeling movement of the geographically mobile light source.

12. The method according to claim 1, wherein for each sky light scattering model, characterizing the light comprises characterizing color of the light, color pattern of the light, intensity of the light, intensity pattern of the light, continuity of the light, location of the light in the sky, height of the light in the sky, width of the light in the sky and/or shape of the light in the sky, as apparent from the corresponding candidate geographic location.

13. The method according to claim 1, further comprising:
automatically obtaining a compass reading at the geographic location; wherein automatically searching the plurality of sky light scattering models comprises automatically adjusting the image or at least some of the plurality of sky light scattering models according to the compass reading.

14. A system for automatically ascertaining a geographic location, the system comprising:
a digital camera configured to capture an image of at least a portion of sky visible upward from the geographic location;
a memory storing a plurality of digital sky light scattering models, each sky light scattering model characterizing light, as the light would appear from a corresponding candidate geographic location after the light was emitted by at least one light source disposed proximate the candidate geographic location and subsequently scattered by particulates disposed in an atmosphere proximate the at least one light source, wherein each sky light scattering model is associated with the corresponding candidate geographic location;
a search engine executed by a processor and configured to search the plurality of sky light scattering models in the memory for a matching sky light scattering model that matches the image within a match criterion; and
a port configured to automatically, to at least one of: a display panel, a map selector, a guidance system, a navigation system and/or a control system, the candidate geographic location associated with the matching sky light scattering model as the ascertained geographic location as a result of the searching, the matching sky light scattering model is found.

15. The system according to claim 14, further comprising a display panel coupled to the port and configured to automatically display the candidate geographic location associated with the matching sky light scattering model.

16. The system according to claim 14, further comprising:
a display panel;
a memory storing a digital map encompassing candidate geographic locations corresponding to at least some of the plurality of sky light scattering models; and
a map selector executed by a processor, coupled to the port and configured to automatically select a portion of the digital map that corresponds to the candidate geographic location associated with the matching sky light scattering model and automatically display, on the display panel, the selected portion of the digital map.

17. The system according to claim 14, further comprising a sky light scattering model generator executed by a processor, configured to automatically generate the plurality of sky light scattering models and store the generated sky light scattering models in the memory.

18. The system according to claim 14, wherein each sky light scattering model characterizes color of the light, color pattern of the light, intensity of the light, intensity pattern of the light, continuity of the light, location of the light in the sky, height of the light in the sky, width of the light in the sky and/or shape of the light in the sky, as apparent from the corresponding candidate geographic location.

19. The system according to claim 14, further comprising:
a compass,
wherein the digital camera is configured to automatically adjust the image according to a reading from the compass.

20. The system according to claim 14, further comprising:
a compass,
wherein the search engine is configured to automatically adjust the image or at least some of the plurality of sky light scattering models according to a reading from the compass.

21. A non-transitory computer-readable medium encoded with instructions that, when executed by a processor, establish processes for performing a computer-implemented method of automatically ascertaining a geographic location, the processes comprising:
  capturing a digital image of at least a portion of sky visible upward from the geographic location;
  automatically generating a plurality of sky light scattering models, each sky light scattering model characterizing light, as the light would appear from a corresponding candidate geographic location after the light was emitted by at least one light source disposed proximate the candidate geographic location and subsequently scattered by particulates disposed in an atmosphere proximate the at least one light source;
  automatically associating, by the processor, each sky light scattering model with the corresponding candidate geographic location;
  automatically searching, by the processor, the plurality of sky light scattering models for a matching sky light scattering model that matches the image within a match criterion; and
  as a result of the searching, the matching sky light scattering model is found, automatically outputting, by the processor, to at least one of: a display panel, a map selector, a guidance system, a navigation system and/or a control system, the candidate geographic location associated with the matching sky light scattering model as the ascertained geographic location.

* * * * *

UNITED STATES PATENT AND TRADEMARK OFFICE
CERTIFICATE OF CORRECTION

| | | |
|---|---|---|
| PATENT NO. | : 9,689,682 B1 | Page 1 of 1 |
| APPLICATION NO. | : 15/086566 | |
| DATED | : June 27, 2017 | |
| INVENTOR(S) | : Laine et al. | |

It is certified that error appears in the above-identified patent and that said Letters Patent is hereby corrected as shown below:

In the Claims

In Column 13, Line 34:
Replace "the image further comprising"
With "the image; the method further comprising"

In Column 13, Line 35:
Replace "the image,"
With "the image:"

In Column 13, Line 49:
Replace "or"
With "and/or"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*